May 3, 1938.   L. D. KAY   2,116,174
BRAKE
Filed July 25, 1936
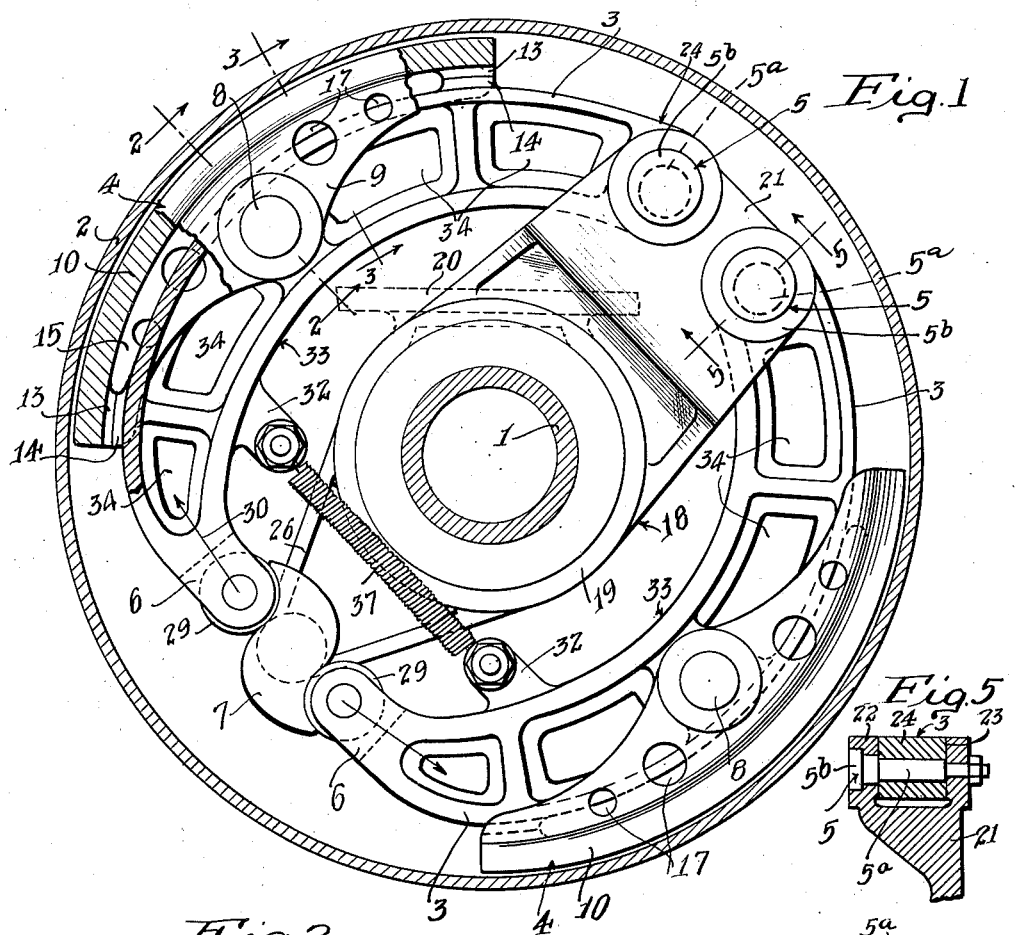
Fig.1
Fig.5
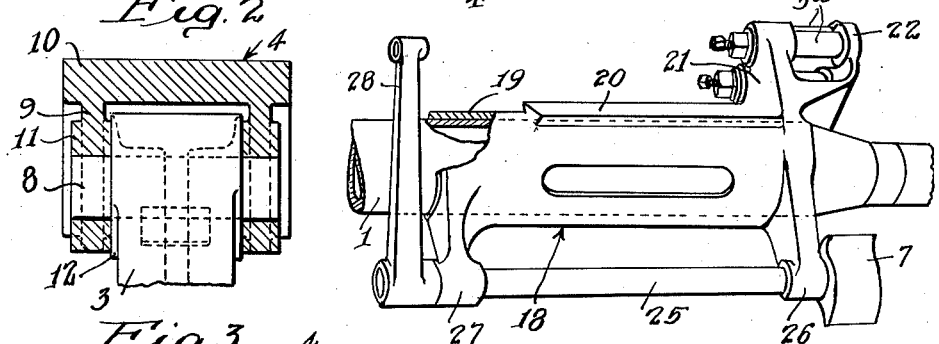
Fig.2
Fig.4
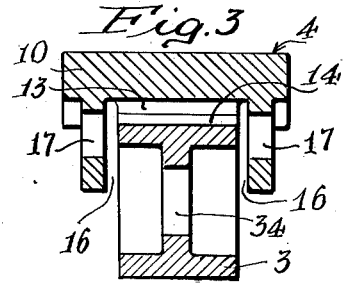
Fig.3
INVENTOR.
Lloyd D. Kay
BY Lyon & Lyon
ATTORNEYS Patented May 3, 1938

2,116,174

UNITED STATES PATENT OFFICE 2,116,174

BRAKE

Lloyd D. Kay, Alhambra, Calif., assignor to Kay Brunner Steel Products, Inc., a corporation Application July 25, 1936, Serial No. 92,580

6 Claims. (Cl. 188—78)

This invention relates to the construction of brakes, and while the invention may be applied to brakes for any specific purpose, the invention is intended particularly to be applied in the construction of brakes for trailers. It is the general practice to provide automobile brakes with lining, and when the lining has worn considerably the brakes must be relined. This occasions a constant expense in the cost of relining.

One of the objects of the present invention is to provide a brake of simple construction in which brake shoes are employed without any lining, so that in applying the brakes the metal face of the shoe is applied directly to the braking surface of the brake drum. One of the difficulties in doing this arises from the fact that in a metal-to-metal friction contact of this kind, the brake shoes become highly heated, and they may expand to such an extent as to cause them to contact the flange of the drum even in the "off" position of the brakes.

One of the objects of this invention is to provide a construction of this kind, in which free air circulation is constantly maintained along the inner faces of the brake shoes, thereby preventing their overheating.

In the present specification the invention is described as applied to a type of brakes in which the brake shoes are mounted on two pivoted brake arms. Such brake arms have been employed heretofore, but the anchor pins for the brake arms have not been supported in such a way as to insure the rigidity which they must have for mounting metal brake shoes, which must be in very accurate alignment with the drums. Such accurate alignment is not necessary in the mounting of line brake shoes because there is considerable flexibility in the lining. One of the objects of this invention is to provide improved means for mounting the brake arms, which will prevent any possible tilting or cocking of the brake arms out of their proper plane, which should be exactly at right angles to the axis of the axle.

In brakes of this type, including oppositely disposed pivoted brake arms, it has been customary to connect the brake arms toward their free ends by a spring, the function of which is to hold the brake shoes normally out of contact with the drum flange. Heretofore these springs have simply been formed with hooks at their ends, hooking into openings in the brake arms. This means for securing the brake springs is not very satisfactory; and one of the objects of the present invention is to provide an improved construction for the brake arms at the point where they are connected to the ends of the brake spring.

In the preferred embodiment of the invention the brake shoes are attached to the brake arms by pins located at or about the middle point of the brake shoe, and engaging pads are formed on the adjacent faces of the shoes and the arms for holding the brake shoes substantially fixed on the brake arms. These pads are located near the ends of the brake shoes. One of the objects of this invention is to provide a construction whereby the thrust against the free ends of the brake arms in spreading them apart to apply the brakes, is exerted substantially in line with the engaging pads that are located toward the free ends of the brake arms. In this way the development of dangerous bending moments at the free ends of the brake arms, is avoided.

A further object of the invention is to mount the brake springs so as to reduce the transmission of heat to them.

A further object of the invention is to provide a construction that will reduce the force necessary to apply the brakes.

Further objects of the invention will appear hereinafter.

The invention consists in the novel parts and combination of parts to be described hereinafter, all of which contribute to produce an efficient brake.

A preferred embodiment of the invention is described in the following specification, while the broad scope of the invention is pointed out in the appended claims.

In the drawing:

Figure 1 is a side elevation looking at the brake assembly from the outer end of the axle, but showing the brake drum and the axle in cross-section. This view also shows portions of one of the brake shoes broken away, and adjacent parts of the brake arm also in section.

Figure 2 is a section taken in a substantially radial plane on the line 2—2 of Fig. 1, and further illustrating the mounting of one of the brake shoes on its brake arm.

Figure 3 is a section taken in a radial plane about on the line 3—3 of Fig. 1, and is a typical section showing the relation of the brake shoe and brake arm that facilitates air circulation along the inner face of the brake shoe.

Fig. 4 is a perspective of one end of the axle, and illustrating the anchor bracket secured to the same. Portions of the anchor bracket and the axle are broken away and shown partially in section. This view shows the end of the axle broken away.

Figure 5 is a section taken about on the line 5—5 of Figure 1, and further illustrating details of the mounting for the ends of the brake arms in the anchor bracket.

Referring more particularly to the parts, 1 indicates the axle, which may be constructed of tubular form as illustrated. The wheel (not illustrated) is mounted on the end of the axle, and has a drum with a braking surface lying adjacent to the brake shoes. In the present instance, this braking surface is the inner face of a flange 2 formed on the brake drum. Within the drum I provide a plurality of brake carriers 3, (preferably two), said brake carriers being movably supported so that in applying the brake, they can be pressed outwardly so as to apply the brake shoes 4 to the inner face of the flange 2. In the present instance, the brake carriers are in the form of arms mounted on adjacent anchor pins 5, and between the free ends 6 of the brake arms a double-toed cam 7 is mounted, which can be rotated in a clockwise direction as indicated in Fig. 1, to spread the brake arms 3 apart and apply the brakes.

In mounting the brake shoes 4 on the arms 3, I prefer to provide a single fastener located at or about the middle point of the brake shoe, which is of general arcuate form. This fastening is preferably in the form of a pin 8, the ends of the pin being mounted in flanges 9 that extend inwardly from the body 10 of the shoe. The flanges 9 on their inner sides are formed with bosses 11 respectively, through which the pins 8 pass, and the faces of these bosses are machined and fit against similar machine bosses 12 formed on the outer side faces of the arms 3 (see Fig. 2). These pins 8 should make a press fit, or driving fit in the arms.

Preferably near the ends of the shoes 4, I provide engaging means between the shoes and the arms, and this means is preferably in the form of integral pads 13 and 14 formed respectively on the shoes, and the outer faces of the arms 3. The engaging faces of these pads are machined on substantially the same radius from the axis of the axle, but if desired, a few thousandths of an inch clearance may be provided at this point to allow for change in form of the shoe, due to heating when the brakes are applied for a long time constantly. These pads 13 and 14 maintain the inner face of the shoe body 10 at a considerable distance from the outer face of the arm 3, so that a substantial air gap 15 is formed between these faces (see Fig. 1).

Furthermore, by reason of the bosses 11 and 12, a considerable air gap 16 is formed adjacent the inner faces of the flanges 9 of the brake shoes (see Fig. 3, which is a typical section). These side air gaps 16, of course, communicate with the gap 15 so as to promote free circulation of air on the inner sides of the flanges 9, and along the inner face of the body 10 of each shoe.

Furthermore, I prefer to provide the side flanges 9 with a plurality of openings 17, which also promote the circulation of air through the channels, which are formed on the inner side of the shoes between end flanges 9.

The shoes 4 are preferably formed of a suitable composition of metal, which should be softer than the drum flange 2, so as to insure that most of the wear will occur on the shoes instead of on the flange.

In order to mount the pins 5, I prefer to employ an anchor bracket 18, the body of which is in the form of a sleeve 19 that is a pressed fit on the tubular axle, said anchor bracket having an integral spring-seat 20 on its upper side, and having an anchor arm 21 in the form of a wide plate extending outwardly from the sleeve in a plane substantially at right angles to the axis of the axle. This anchor arm 21 is formed with an integral fork 22 that is offset laterally from the same toward the extreme outer end of the axle 1. The inner faces 23 of the arm 21 and fork 22 are machined, and between these faces 23 the pivoted ends 24 of the brake arms 3 are mounted. These ends 24 of the arms 3 fill the space between the faces 23, and are secured in place by the pins 5 already referred to. By reason of this construction the arms 3, although freely movable in or out on the axes of the pins, are held rigidly against cocking or tilting out of the plane in which they should move; that is to say, in a plane at right angles to the axis of the axle. In a similar manner the bosses 11 on the flanges 9 on the shoes seating against the bosses 12 on the side faces of the arms, prevent any possibility of the shoes 4 cocking or tilting out of their proper plane. Any tendency to cock or tilt in this way, that might be manifested by the brake shoes, will also be prevented by the engaging pads 13 and 14. These pads 13 and 14, however, do not extend throughout the entire width of the arms 3 (see Fig. 2). In this way spaces are left at the sides of the pads to permit free circulation of air through the shoes from their ends. If desired, the cam shaft 25 that carries the cam 7, may be carried on arms 26 and 27 formed integral with the sleeve 19, the latter arm being in line with the anchor arm 21, and practically a continuation of the same. One end of the cam shaft 25 carries a lever 28 for rotating the cam shaft 25 to apply the brakes.

The bodies 5ᵃ of the pins 5 are preferably formed eccentric with the heads 5ᵇ of these pins (see Fig. 5) so as to enable the axis of rotation of the arms 3 to be adjusted toward or from the drum flange to take up wear on the brake shoes.

The free ends 6 of the brake arms 3 carry rollers 29 respectively, to ride on the faces of the cam 7, and these ends 6 project along a line connecting the centers of the rollers 29 with the pads 13 and 14 that are located toward the free ends of the arms 3. On this account the line of thrust forces exerted by the faces of the cam 7 will be along a line indicated by the arrow 30, which line will pass through the engaging pads 13 and 14. In this way the spreading forces to apply the brakes are taken up without developing any dangerous bending moments in the brake arms. In other words, the ends 6 operate as posts taking compression between the rollers 29 and the pads 13. These rollers greatly reduce the friction between the cam and the brake arms, and thereby considerably reduce the force that it is necessary to exert in applying the brakes. They also considerably reduce the wear on the cam.

It is the usual practice to secure the spring in a brake construction that holds the brakes off, to an eye bolt or similar means formed on the brake arms. I prefer to provide a coil spring 31 for holding the brake arms up against the cam 7, and the ends of this spring are secured to posts 32 that project inwardly a considerable distance from the inner faces 33 of the brake arms. One of the advantages of this construction is that there is a considerable amount of metal for the heat to pass through from the brake shoes before it reaches the ends of the spring at the posts 32. Hence with this construction the springs will not become extremely hot, and therefore will not lose their tension due to overheating. This effect of retarding the transmission of heat to the posts 32 is greatly increased by providing air circulation openings 34 through the brake arms.

It is understood that the embodiment of the invention described herein is only one of the many embodiments this invention may take, and I do not wish to be limited in the practice of the invention, nor in the claims, to the particular embodiment set forth.

What I claim is:

1. In a brake, the combination of a brake drum, brake shoe-carriers movably mounted within the drum, shoes carried by the said shoe-carriers, a fastener for securing each brake shoe to its corresponding carrier at an intermediate point on the length of the brake shoe, said shoes and said shoe-carriers having unattached faces constantly in engagement with each other at points removed from said fastener, and cooperating to hold the shoes substantially fixed on the shoe carriers, so that thrust is imparted through the engaging faces from the shoe carriers to the shoes when the braking force is applied.

2. In a brake construction, the combination of a drum having a braking face, shoe-carriers associated with said drum and mounted for movement toward the braking face, a shoe corresponding to each shoe-carrier for engaging the braking face, a pin located near the middle portion of each shoe and securing the same to its corresponding shoe-carrier, each shoe and shoe-carrier having unattached engaging pads constantly in engagement with each other, located toward the ends of the shoe, the adjacent faces of said shoe and said shoe-carrier between said engaging faces being disposed apart to facilitate circulation of air between the same.

3. In a brake construction, the combination of a drum having a brake flange, a pair of brake arms pivotally mounted within the drum for outward swinging movement in applying the brake, a brake shoe corresponding to each brake arm, said shoes having flanges lying along the sides of the arms, a pin corresponding to each shoe secured at said flanges for attaching the brake shoes to the brake arms, there being engaging pads constantly in engagement with each other, formed between said arms and said shoes adjacent the ends of said shoes, the inner faces of the shoes being removed from the outer faces of the arms so as to form air gaps for circulation of air between the flanges and along the inner side of the shoe.

4. In a brake construction, the combination of a drum having a brake flange, a pair of brake arms pivotally mounted within the drum for outward swinging movement in applying the brake, a brake shoe corresponding to each brake arm, said shoes having flanges lying along the sides of the arms, a pin corresponding to each shoe secured at said flanges for attaching the brake shoes to the brake arms, there being engaging pads constantly in engagement with each other, formed between said arms and said shoes adjacent the ends of said shoes, the inner faces of the shoes being removed from the outer faces of the arms so as to form air gaps for circulation of air between the flanges and along the inner side of the shoe, the inner faces of said flanges being removed from the sides of the brake arms to form air gaps communicating with the first-named air gaps.

5. In a brake construction, the combination of a drum having a brake flange, a pair of pivotally mounted brake arms within the drum adapted to swing outward toward the flange in applying the brake, a brake shoe corresponding to each brake arm, a pin corresponding to each shoe securing the same to the brake arms, there being unattached pads formed between said arms and said shoes, engaging with each other to prevent movement of the shoes relative to their carriers, and located adjacent the ends of said shoes, said arms having extensions projecting inwardly at the inner sides of the arms, and a spring connecting said extensions for normally holding the brake shoes out of contact with the flange.

6. In a brake construction, the combination of an axle, a brake anchor bracket secured to the axle near the end thereof, said bracket having an arm extending therefrom substantially at right angles to the axis of the axle, said arm having an integral fork extending laterally therefrom, a pair of anchor pins with their ends mounted in said forks, a brake drum concentric with the axle and having a brake flange, a brake arm pivotally mounted on each anchor pin for outward swinging movement toward the flange, a brake shoe corresponding to each brake, each brake shoe having a body for engaging the brake flange and having inwardly projecting flanges located at the sides of the brake arms, a pin securing each brake shoe to its corresponding arm substantially at the middle point of the shoe, there being unattached engaging pads constantly in engagement with each other, between the outer faces of the brake arms and the inner faces of the shoe bodies cooperating with the last-named pins to hold the brake shoes fixedly on the brake arms.

LLOYD D. KAY.